(12) United States Patent
Sano et al.

(10) Patent No.: US 10,773,663 B2
(45) Date of Patent: Sep. 15, 2020

(54) ROUTING STRUCTURE

(71) Applicant: Yazaki Corporation, Tokyo (JP)

(72) Inventors: Hikaru Sano, Shizuoka (JP); Goro Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/671,180

(22) Filed: Nov. 1, 2019

(65) Prior Publication Data

US 2020/0139907 A1 May 7, 2020

(30) Foreign Application Priority Data

Nov. 7, 2018 (JP) .................................. 2018-209858

(51) Int. Cl.
*B60R 16/02* (2006.01)
*B60N 2/07* (2006.01)
*H02G 3/04* (2006.01)

(52) U.S. Cl.
CPC ........ *B60R 16/0215* (2013.01); *B60N 2/0715* (2013.01); *H02G 3/0437* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,026,379 A | * | 5/1977 | Dunn | B60N 2/143 180/331 |
| 6,302,980 B1 | * | 10/2001 | Kortenbach | H01B 7/285 156/48 |
| 6,386,620 B1 | | 5/2002 | Fukumoto et al. | |
| 6,566,603 B2 | * | 5/2003 | Doshita | B60R 16/0215 174/135 |
| 6,603,076 B2 | * | 8/2003 | Doshita | B60R 16/0215 174/135 |
| 7,076,862 B2 | * | 7/2006 | Nave | H02G 1/085 29/33 M |
| 7,238,029 B2 | * | 7/2007 | Tsubaki | B60R 16/0215 174/72 A |

(Continued)

FOREIGN PATENT DOCUMENTS

| | | |
|---|---|---|
| DE | 11 2016 004 489 T5 | 6/2018 |
| DE | 11 2016 005 928 T5 | 10/2018 |

(Continued)

*Primary Examiner* — Binh B Tran
*Assistant Examiner* — Krystal Robinson
(74) *Attorney, Agent, or Firm* — Kenealy Vaidya LLP

(57) ABSTRACT

A routing structure includes a flexible conductive body, a flexible regulating member, a flexible exterior member, and a case. The conductive body has one end fixed to a vehicle body and has the other end fixed to a seat sliding along a rail arranged on the vehicle body. The regulating member extends along the conductive body and regulates a route of the conductive body. The exterior member has the conductive body and the regulating member each inserted therein, and is inserted into the rail. The case is arranged adjacent to the rail, houses parts of the conductive body, the regulating member, and the exterior member on the side of the vehicle body, and absorbs extra lengths of the conductive body, the regulating member, and the exterior member depending on the sliding of the seat.

4 Claims, 7 Drawing Sheets

(56) References Cited

U.S. PATENT DOCUMENTS

| | | | | |
|---|---|---|---|---|
| 7,402,750 B2* | 7/2008 | Daub | ............... | B60R 16/0215 |
| | | | | 174/72 A |
| 8,624,114 B2* | 1/2014 | Oga | ............... | B60R 16/0215 |
| | | | | 174/72 A |
| 8,841,551 B2* | 9/2014 | Sekino | ............... | B60N 2/0715 |
| | | | | 174/68.3 |
| 10,038,314 B2* | 7/2018 | Satou | ............... | B60R 16/027 |
| 10,249,982 B2* | 4/2019 | Sekino | ............... | H01R 13/72 |
| 2001/0004022 A1* | 6/2001 | Kobayashi | ............... | B60R 16/0207 |
| | | | | 174/72 A |
| 2002/0014348 A1* | 2/2002 | Aoki | ............... | H02G 11/006 |
| | | | | 174/72 A |
| 2003/0119338 A1* | 6/2003 | Bigotto | ............... | H02G 11/006 |
| | | | | 439/34 |
| 2005/0092512 A1* | 5/2005 | Kogure | ............... | B60R 16/0207 |
| | | | | 174/72 A |
| 2007/0087635 A1* | 4/2007 | Terada | ............... | H02G 11/006 |
| | | | | 439/701 |
| 2011/0290522 A1 | 12/2011 | Sekino et al. | | |
| 2012/0168225 A1* | 7/2012 | Satou | ............... | H02G 11/006 |
| | | | | 174/70 R |
| 2014/0231131 A1* | 8/2014 | Sekino | ............... | B60R 16/027 |
| | | | | 174/542 |
| 2014/0339376 A1 | 11/2014 | Katou et al. | | |
| 2014/0353415 A1* | 12/2014 | Katsuramaki | ............... | H02G 11/02 |
| | | | | 242/371 |
| 2015/0360629 A1* | 12/2015 | Sekino | ............... | B60R 16/0215 |
| | | | | 174/68.3 |
| 2016/0059801 A1* | 3/2016 | Katsuramaki | ............... | H02G 11/02 |
| | | | | 191/12.2 R |
| 2017/0294767 A1* | 10/2017 | Sano | ............... | H02G 11/02 |
| 2017/0320218 A1* | 11/2017 | Yoon | ............... | B25J 18/02 |
| 2018/0178751 A1* | 6/2018 | Katsuramaki | ............... | B60R 22/4604 |
| 2018/0370389 A1* | 12/2018 | Miyata | ............... | H02G 11/00 |

FOREIGN PATENT DOCUMENTS

| | | |
|---|---|---|
| JP | 5550631 B2 | 7/2014 |
| WO | 00/73095 A1 | 12/2000 |

\* cited by examiner

ROUTING STRUCTURE

CROSS-REFERENCE TO RELATED APPLICATION(S)

The present application claims priority to and incorporates by reference the entire contents of Japanese Patent Application No. 2018-209858 filed in Japan on Nov. 7, 2018.

BACKGROUND OF THE INVENTION

1. Field of the Invention

The present invention relates to a routing structure.

2. Description of the Related Art

Conventionally, there has been a technique for routing electric wires between a vehicle body of a vehicle and a sliding body such as a seat. Japanese Patent No. 5550631 discloses a sliding device for routing an electric wire between a vehicle body and a sliding body that is supported by a supporting body slidably attached to a long tubular supporting rail fixed to the vehicle body. In the sliding device of Japanese Patent No. 5550631, an electric wire is received in a tube made of an elastically deformable material.

In this sliding device, when a seat slides, a force in an axis direction acts on a conductive body. This force may cause a conductive body to buckle or to meander. It is preferable to prevent buckling and meandering of a conductive body.

SUMMARY OF THE INVENTION

An objective of the present invention is to provide a routing structure capable of preventing buckling and meandering of a conductive body.

A routing structure according to one aspect of the present invention includes a flexible conductive body that has one end fixed to a vehicle body and has the other end fixed to a seat sliding along a rail arranged on the vehicle body; a flexible regulating member that extends along the conductive body and regulates a route of the conductive body; a flexible exterior member into which the conductive body and the regulating member are inserted, the flexible exterior member being inserted into the rail; and a case that is arranged adjacent to the rail, houses parts of the conductive body, the regulating member, and the exterior member on a side of the vehicle body, and absorbs extra lengths of the conductive body, the regulating member, and the exterior member depending on the sliding of the seat.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

A routing structure according to an embodiment of the present invention will now be described in detail with reference to the accompanying drawings. It should be noted that this embodiment is not intended to limit this invention. Components in the embodiment include components that can be easily conceived of by the skilled person or substantially like components.

Embodiment

Figure 1:
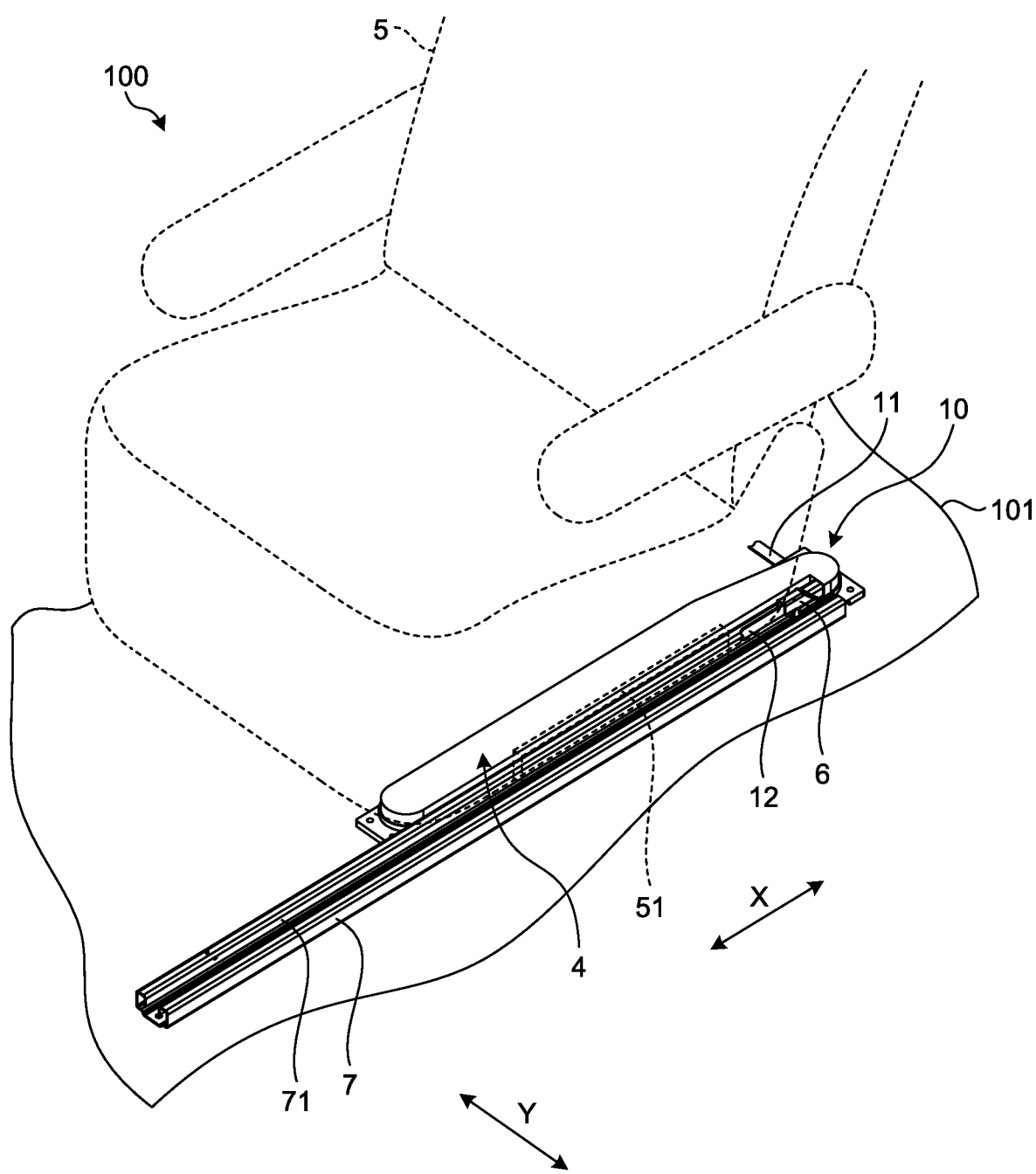
FIG. 1 is a perspective view illustrating a seat and a routing structure in accordance with an embodiment.
Figure 2:
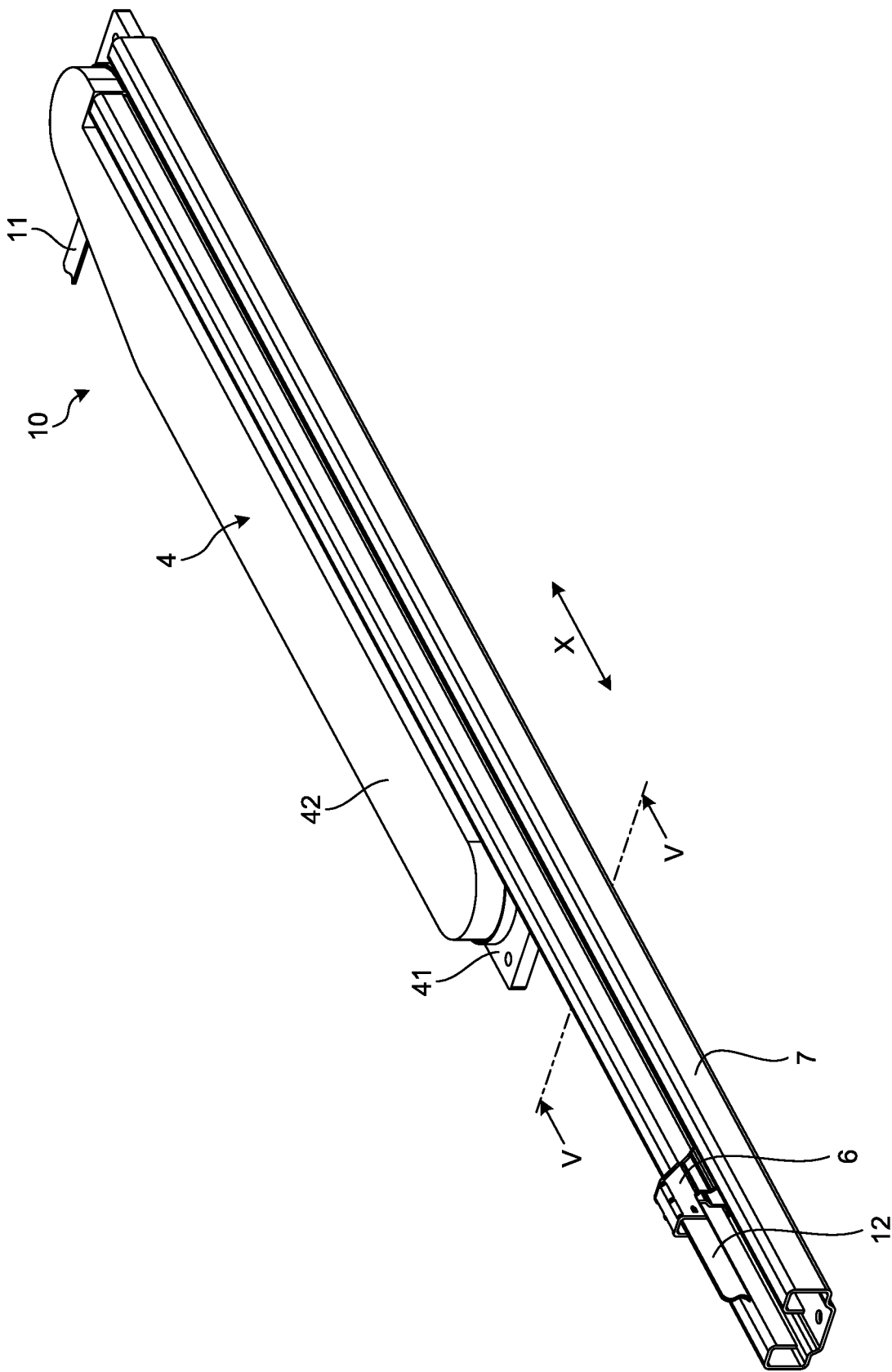
FIG. 2 is a perspective view illustrating the routing structure in accordance with the embodiment.
Figure 3:
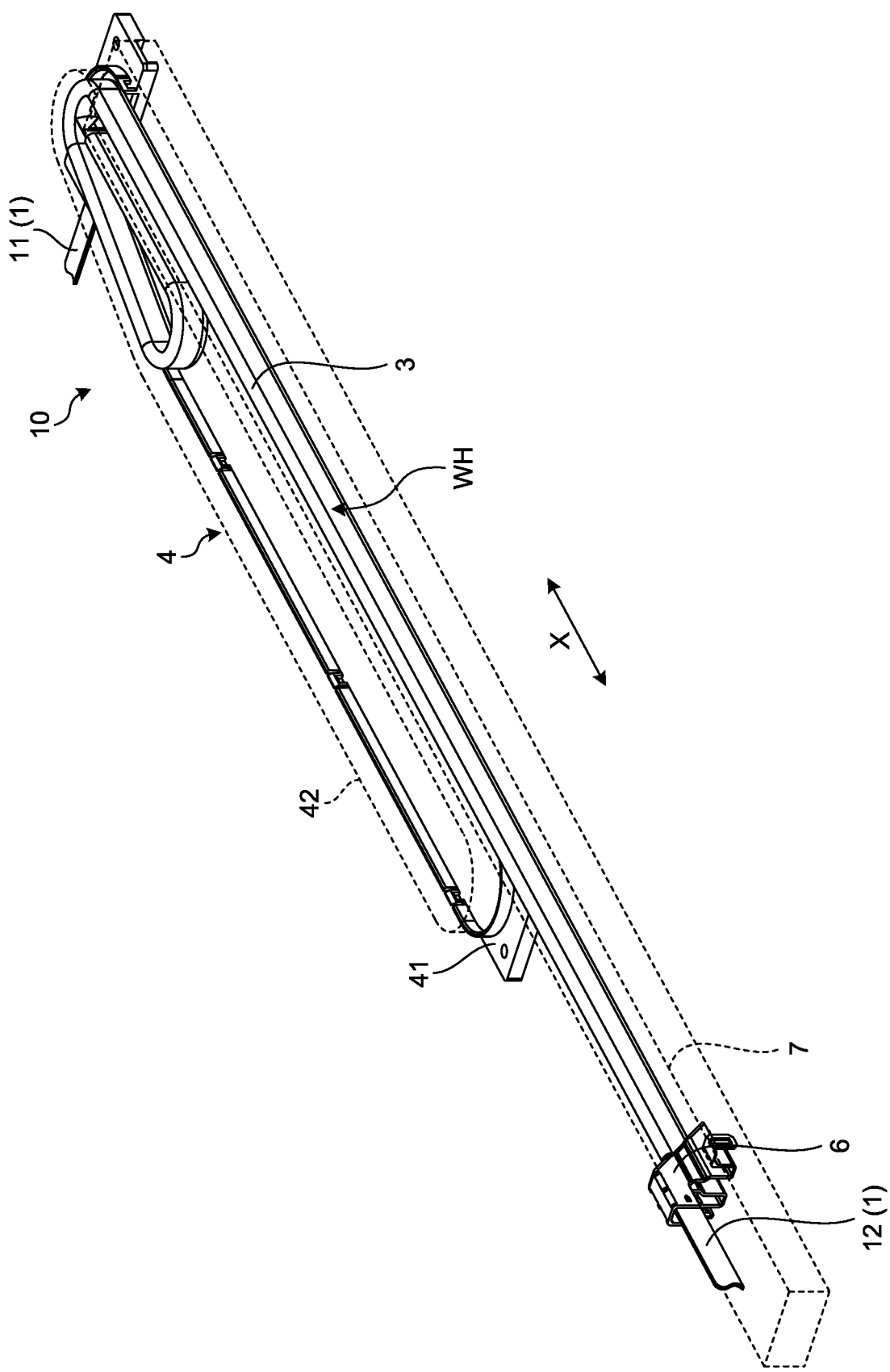
FIG. 3 is a perspective view illustrating an inside of the routing structure in accordance with the embodiment.
Figure 4:
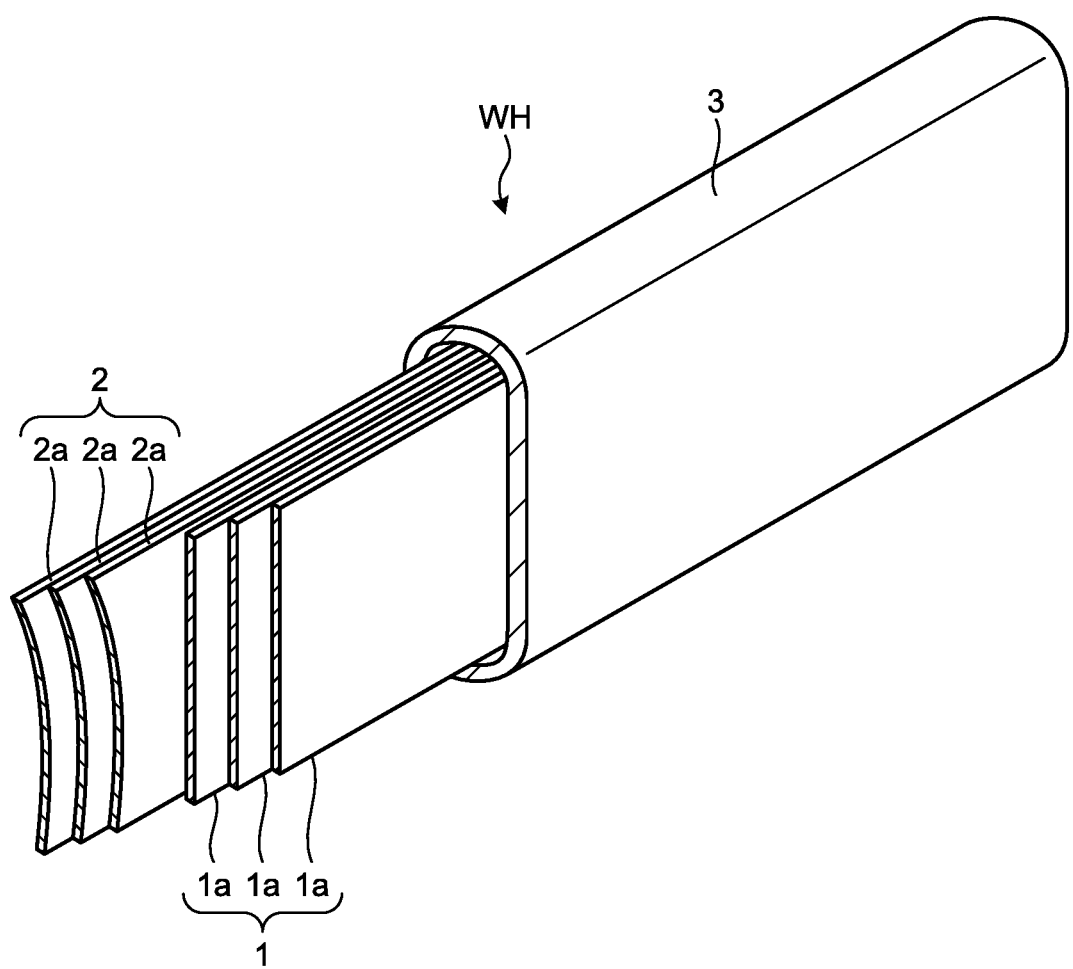
FIG. 4 is a perspective view illustrating a wire harness in accordance with the embodiment.
Figure 5:
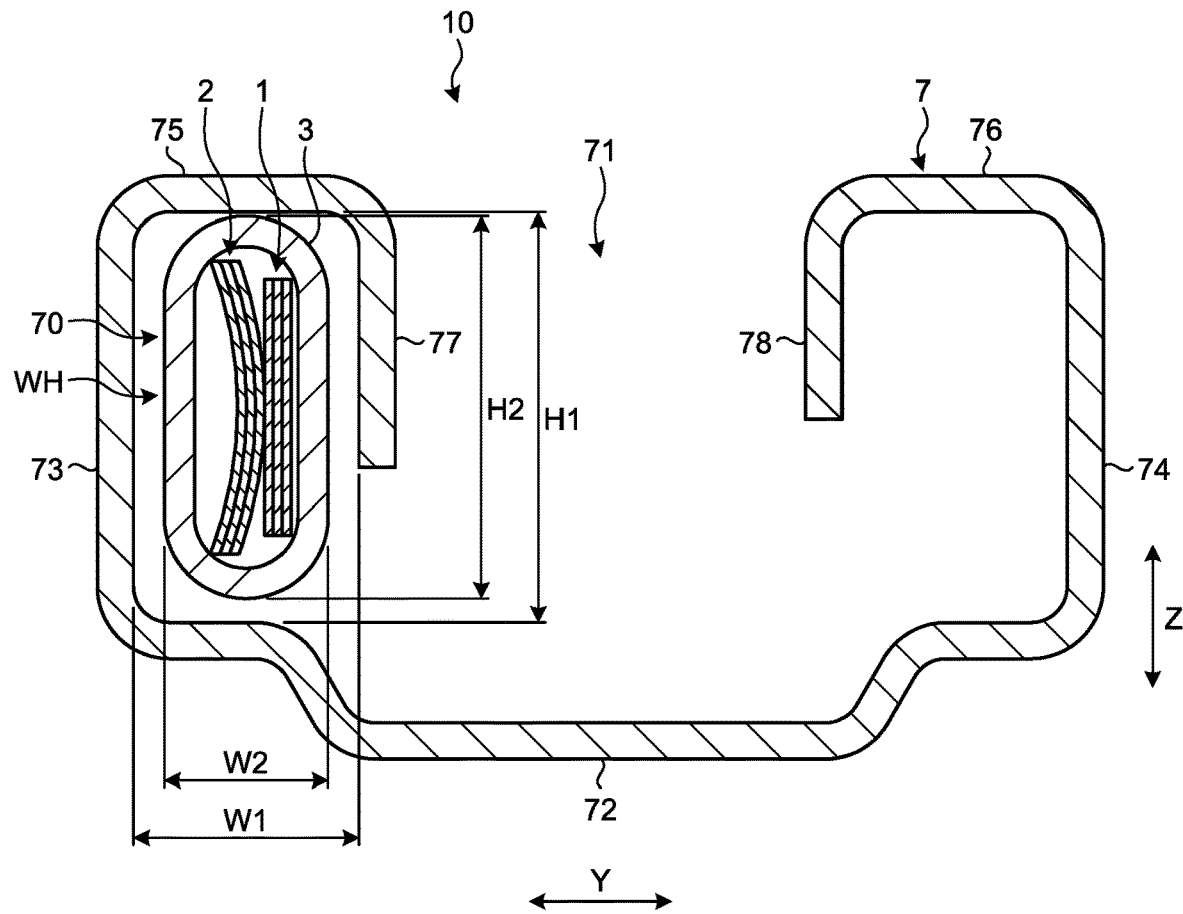
FIG. 5 is a cross-sectional view illustrating the routing structure in accordance with the embodiment.
Figure 6:
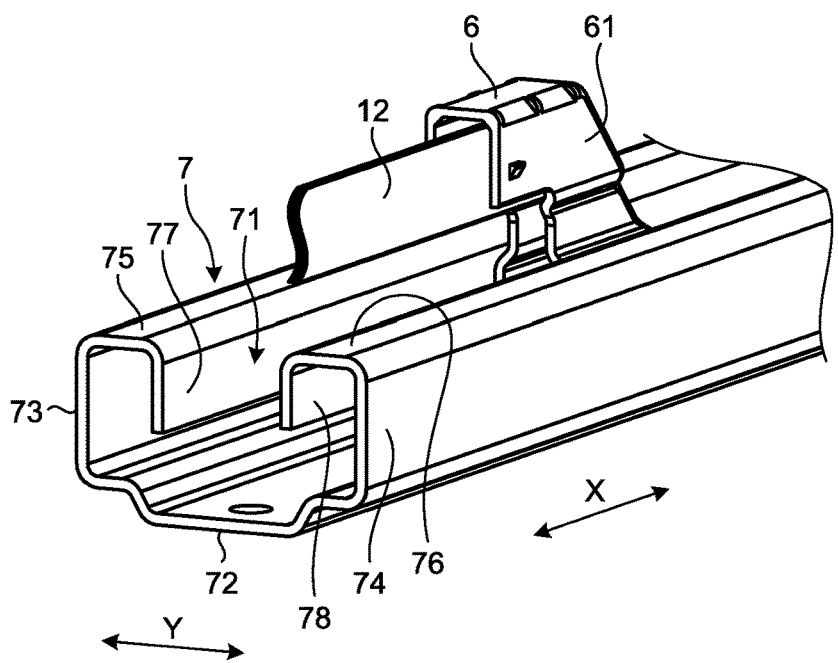
FIG. 6 is a perspective view illustrating a rail and a sliding member in accordance with the embodiment.
Figure 7:
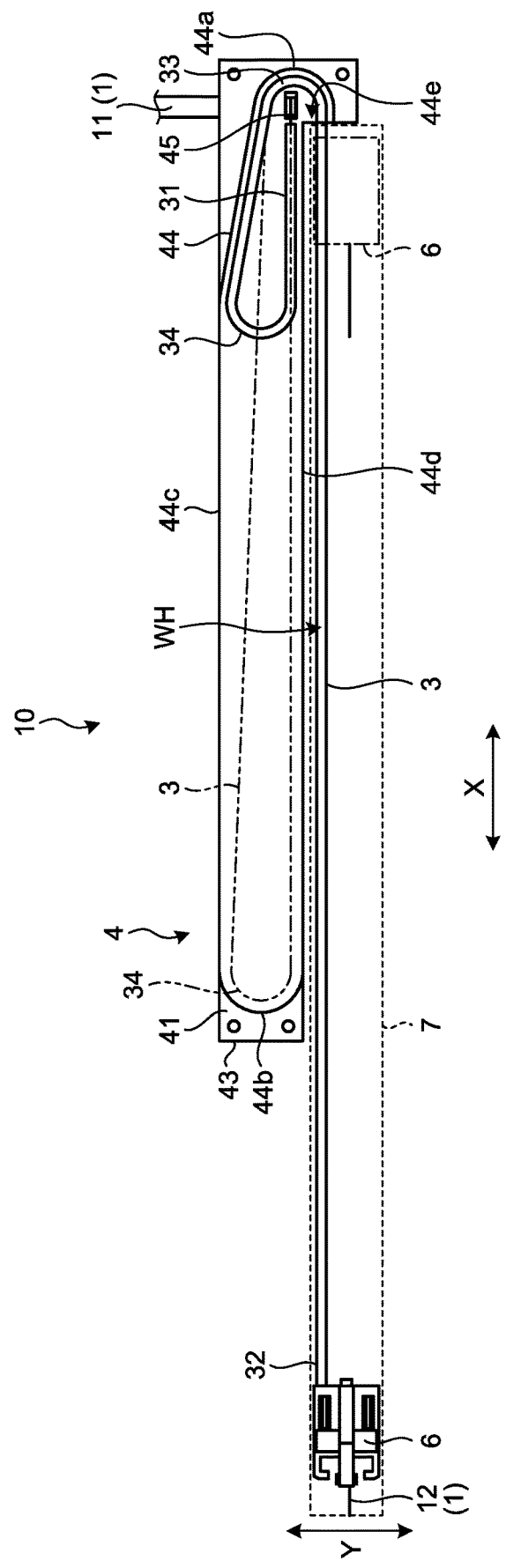
FIG. 7 is a plan view illustrating the inside of the routing structure in accordance with the embodiment.
Figure 8:
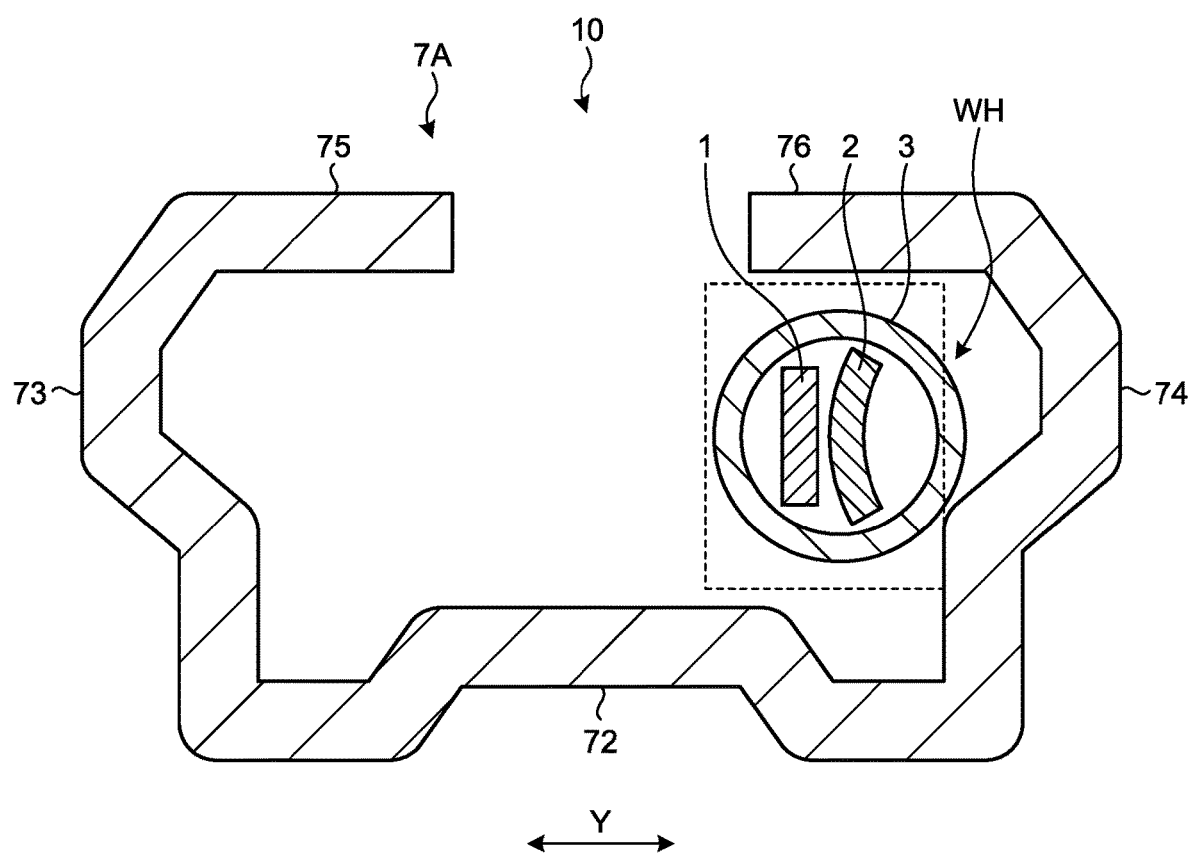
FIG. 8 is a cross-sectional view illustrating an example of the shape of the rail.

An embodiment will be described with reference to FIGS. 1 to 8. The present embodiment relates to a routing structure. FIG. 1 is a perspective view illustrating a seat and the routing structure in accordance with the embodiment. FIG. 2 is a perspective view illustrating the routing structure in accordance with the embodiment. FIG. 3 is a perspective view illustrating an inside of the routing structure in accordance with the embodiment. FIG. 4 is a perspective view illustrating a wire harness in accordance with the embodiment. FIG. 5 is a cross-sectional view illustrating the routing structure in accordance with the embodiment. FIG. 6 is a perspective view illustrating a rail and a sliding member in accordance with the embodiment. FIG. 7 is a plan view illustrating the inside of the routing structure in accordance with the embodiment. FIG. 8 is a cross-sectional view illustrating an example of the shape of the rail. FIG. 5 illustrates a cross-sectional view along line V-V in FIG. 2.

As illustrated in FIGS. 1 to 4, a routing structure 10 of the embodiment includes a conductive body 1, a regulating member 2, an exterior member 3, and a case 4. The conductive body 1 is a flexible conductive member for connecting a side of a vehicle body 101 in a vehicle 100 with a seat 5. The conductive body 1 of the present embodiment has a plate shape or a belt shape. As illustrated in FIG. 4, the conductive body 1 of the present embodiment includes a plurality of flexible flat cables (FFCs) 1a. Each of the FFCs 1a includes a plurality of core wires that are arranged in parallel and a covering that integrally covers the core wires. Each of the core wires functions as a power source wire for supplying power and a signal wire. A first end part 11 of the conductive body 1 is connected to a power source and the like arranged on the vehicle body 101. A second end part 12 of the conductive body 1 is connected to a device arranged on the seat 5. In the present embodiment, a wire harness WH is formed of the conductive body 1, the regulating member 2, and the exterior member 3. The wire harness WH may further include connectors that are connected to the first end part 11 and the second end part 12 of the conductive body 1.

In the vehicle body 101, a rail 7 is arranged. The rail 7 of the present embodiment extends along a vehicle front-rear direction X. On the upper surface of the rail 7, a slit 71 is formed. The seat 5 slides along the rail 7. More specifically, a support member 51 supported by the rail 7 is provided to the seat 5. The seat 5 is supported by the rail 7 through the support member 51. The support member 51 is guided by the slit 71 of the rail 7, and slides along the vehicle front-rear direction X. The rail 7 and the support member 51 are arranged on both sides of the seat 5 in a vehicle width direction Y.

The regulating member 2 is a member for regulating a route of the conductive body 1. For example, the regulating member 2 has bending rigidity higher than that of the conductive body 1. As illustrated in FIG. 4, the regulating member 2 of the present embodiment is formed by laminating a plurality of plate-like members 2a. Each of the plate-like members 2a is a flexible member, and is, for example, a metal plate. The plate-like member 2a of the present embodiment has a curved cross-sectional shape. The plate-like member 2a has, for example, a circular arc cross-sectional shape. The plate-like members 2a are laminated so that a projecting curve surface of the one plate-like member 2a and a recessed curve surface of the other plate-like member 2a face each other. For example, the regulating member 2 supports the conductive body 1 so that a route on which the conductive body 1 extends does not deviate from a desirable route.

The exterior member 3 is a flexible cylindrical member, and is formed of, for example, an insulating synthetic resin. The exterior member 3 of the present embodiment is a tube that is formed in a bellows shape. The exterior member 3 is formed so as to be freely curved at any point. For example, the exterior member 3 has an elongated circle cross-sectional shape. As illustrated in FIG. 4, the conductive body 1 and the regulating member 2 are inserted into the exterior member 3. The conductive body 1 and the regulating member 2 may be inserted together into the exterior member 3 in a laminated state, and may be individually inserted into the exterior member 3. Both ends of the conductive body 1 and the regulating member 2 project from the exterior member 3.

As illustrated in FIG. 5, the exterior member 3, the conductive body 1, and the regulating member 2 are inserted into a passage 70 of the rail 7. The rail 7 is a cylindrical member, and is, for example, formed by performing bending processing and the like on a metal plate. The rail 7 includes a bottom wall part 72, a first side wall part 73, a second side wall part 74, a first top wall part 75, a second top wall part 76, a first guide wall part 77, and a second guide wall part 78.

The bottom wall part 72 is a base part of the rail 7, and is, for example, supported by the vehicle body 101. The first side wall part 73 and the second side wall part 74 are vertically arranged to stand from end parts of the bottom wall part 72 in the vehicle width direction Y. The first side wall part 73 and the second side wall part 74 face each other in the vehicle width direction Y. The first top wall part 75 and the second top wall part 76 face the bottom wall part 72 in a height direction Z. The first top wall part 75 extends from the top part of the first side wall part 73 to a side of the second side wall part 74. The second top wall part 76 extends from the top part of the second side wall part 74 to a side of the first side wall part 73.

The first guide wall part 77 and the second guide wall part 78 face each other in the vehicle width direction Y. The first guide wall part 77 extends from an inner end part of the first top wall part 75 in the vehicle width direction Y to a side of the bottom wall part 72. The second guide wall part 78 extends from an inner end part of the second top wall part 76 in the vehicle width direction Y to the side of the bottom wall part 72. A gap is provided between the first guide wall part 77 and the second guide wall part 78. This gap is the slit 71.

The passage 70 is a space that is surrounded by the bottom wall part 72, the first side wall part 73, the first top wall part 75, and the first guide wall part 77. The passage 70 has substantially a rectangular cross-sectional shape. The passage 70 of the present embodiment is formed in a vertically long shape in which a width W1 in the vehicle width direction Y is smaller than a height H1 in the height direction Z. The exterior member 3 is inserted into the passage 70 in an attitude that a long axis direction of the exterior member 3 coincides with a longitudinal direction of the passage 70, in other words, in an attitude that the long axis direction coincides with the height direction Z. Thus, the conductive body 1 and the regulating member 2 face each other in the exterior member 3 in the vehicle width direction Y.

A width W2 of the exterior member 3 in a short axis direction is smaller than the width W1 of the passage 70. In other words, in the vehicle width direction Y, a gap is provided between the lateral surface of the exterior member 3 and the rail 7. A height H2 of the exterior member 3 in the long axis direction is smaller than the height H1 of the passage 70. In other words, in the height direction Z, a gap is provided between the lateral surface of the exterior member 3 and the rail 7.

As illustrated in FIG. 6, the second end part 12 of the conductive body 1 is held by a sliding member 6. The sliding member 6 is a member for being guided by the rail 7 along the vehicle front-rear direction X. The sliding member 6 slides in the vehicle front-rear direction X with movement of the seat 5. The sliding member 6 is, for example, connected to the support member 51 of the seat 5. The sliding member 6 includes a hollow gutter-like part 61 that projects upward from the rail 7. The gutter-like part 61 is open to the front, in other words, a side of the seat 5. The second end part 12 of the conductive body 1 extends from the exterior member 3 in the passage 70 of the rail 7, and is drawn out to an external space of the rail 7 via the inside of the gutter-like part 61. The second end part 12 is electrically connected to a device arranged on the seat 5 through a connector and the like.

As illustrated in FIG. 2 and the like, the case 4 is arranged adjacent to the rail 7. The case 4 includes a main body 41 and a cover 42. The main body 41 is, for example, held by the vehicle body 101. As illustrated in FIG. 7, the main body 41 includes a base part 43 and a peripheral wall 44. The base part 43 is substantially a flat plate-like component, and extends along the rail 7 in the vehicle front-rear direction X. The peripheral wall 44 is a wall part that is provided to stand from the base part 43. The peripheral wall 44 is, for example, formed integrally with the base part 43. The peripheral wall 44 has substantially an elongated circle shape in a plan view. The long axis direction of the peripheral wall 44 is the vehicle front-rear direction X.

The peripheral wall 44 includes a first curved part 44a, a second curved part 44b, a first straight line part 44c, and a second straight line part 44d. The first curved part 44a and the second curved part 44b are each formed in a circular arc shape. The first curved part 44a is positioned at a rear end of the peripheral wall 44 in the vehicle front-rear direction X, and is curved toward the rear. The second curved part 44b is positioned at a front end of the peripheral wall 44 in the vehicle front-rear direction X, and is curved toward the front.

The first straight line part 44c and the second straight line part 44d are formed of linear wall parts. The first straight line part 44c connects an end part of the first curved part 44a on a side far from the rail 7 with an end part of the second curved part 44b on a side far from the rail 7. The second straight line part 44d is connected to an end part of the second curved part 44b on a side close to the rail 7, and extends in parallel with the rail 7 along the vehicle front-rear direction X. Between a rear end of the second straight line part 44d and the first curved part 44a, an aperture 44e is formed. The exterior member 3 is drawn out from the inside of the case 4 to the outside thereof through the aperture 44e, and is inserted into the rail 7.

A first end part 31 of the exterior member 3 is held inside the case 4. The first end part 31 is held at the rear end part of and inside the case 4 in an attitude that an aperture is directed to the rear of a vehicle. The case 4 holds an end part of the regulating member 2 in addition to the first end part 31. The case 4 holds, for example, a part of the regulating member 2 that projects from the first end part 31. A second end part 32 of the exterior member 3 is held by the sliding member 6. The sliding member 6 holds an end part of the regulating member 2 in addition to the second end part 32.

The exterior member 3 is curved in the case 4 so as to be formed in a spiral shape. More specifically, in the case 4, the exterior member 3 has a first curved part 33 and a second curved part 34 formed thereon. The first curved part 33 is a curved part that is formed along the first curved part 44a of the peripheral wall 44. The second curved part 34 is a curved part that is formed between the first end part 31 and the first curved part 33. In the exterior member 3, the conductive body 1 and the regulating member 2 each have a curved part corresponding to the first curved part 33 and a curved part corresponding to the second curved part 34 formed thereon. The first end part 11 of the conductive body 1 is drawn out from an aperture 45 formed on the main body 41 of the case 4 to the outside of the case 4.

The case 4 is formed so as to house an extra length part of the exterior member 3. FIG. 7 illustrates the sliding member 6 positioned at a rear end by alternate long and two short dashes line. FIG. 7 also illustrates the exterior member 3 when the sliding member 6 is positioned at the rear end by alternate long and two short dashes line. When the sliding member 6 is positioned at the rear end, the second curved part 34 of the exterior member 3 is positioned in the vicinity of the second curved part 44b of the peripheral wall 44.

The routing structure 10 of the present embodiment includes the regulating member 2 that extends along the conductive body 1. The regulating member 2 is a member for regulating a route of the conductive body 1. For example, the regulating member 2 has bending rigidity higher than that of the conductive body 1. Arranging the regulating member 2 along the conductive body 1 prevents the conductive body 1 from meandering and buckling. For example, when the sliding member 6 slides rearward, in the rail 7 and the case 4, a compressive force in an axis direction acts on the conductive body 1, the regulating member 2, and the exterior member 3. In the routing structure 10 of the present embodiment, the regulating member 2 keeps a linear shape against a compressive force. Thus, the regulating member 2 can regulate buckling and meandering of the conductive body 1.

According to the routing structure 10 of the present embodiment, the wire harness WH formed of the conductive body 1, the regulating member 2, and the exterior member 3 can maintain a linear shape without being supported by the other members. Thus, it is not necessary to provide the configuration for regulating buckling and meandering of the wire harness WH to the rail 7 and the like. The rail 7 may have a shape illustrated in FIG. 8.

In the rail 7 illustrated in FIG. 8, the first guide wall part 77 and the second guide wall part 78 are omitted as compared with the rail 7 illustrated in FIG. 5. In the example illustrated in FIG. 8, the wire harness WH extends along the second side wall part 74. The wire harness WH can maintain a linear shape along the second side wall part 74 without being supported by the second guide wall part 78. Thus, according to the routing structure of the present embodiment, a degree of freedom in the design of the rail 7 is improved. For example, omitting the first guide wall part 77 and the second guide wall part 78 enables the height and weight and the like of the rail 7 to be reduced.

As described above, the routing structure 10 of the present embodiment includes the flexible conductive body 1, the flexible regulating member 2, the flexible exterior member 3, and the case 4. In the conductive body 1, the first end part 11 is fixed to the vehicle body 101, and the second end part 12 is fixed to the seat 5. The seat 5 is a sliding seat that slides along the rail 7 arranged on the vehicle body 101. The regulating member 2 is a member that extends along the conductive body 1 and is for regulating a route of the conductive body 1.

The exterior member 3 is a member in which the conductive body 1 and the regulating member 2 are inserted. The exterior member 3 is inserted into the rail 7 together with the conductive body 1 and the regulating member 2. The case 4 is arranged adjacent to the rail 7. The case 4 houses parts of the conductive body 1, the regulating member 2, and the exterior member 3, the parts being on the side of the vehicle body 101. The case 4 absorbs extra lengths of the conductive body 1, the regulating member 2, and the exterior member 3 depending on the sliding of the seat 5. According to the routing structure 10 of the present embodiment, the regulating member 2 prevents buckling and meandering of the wire harness WH.

The regulating member 2 of the present embodiment includes the plate-like member 2a that has a curved cross-sectional shape orthogonal to a longitudinal direction. This kind of plate-like member 2a easily maintains a linear shape. Thus, the regulating member 2 of the present embodiment can appropriately prevent meandering and buckling of the wire harness WH.

In the present embodiment, the regulating member 2 has a plurality of the plate-like members 2a laminated therein. Thus, the regulating member 2 can be curved in a shape along the first curved part 44a in the case 4 with a linear shape being appropriately maintained in the rail 7.

In the present embodiment, an end part of the regulating member 2 on the side of the vehicle body 101 is held inside the case 4. With the end part of the regulating member 2 being held, an attitude of the regulating member 2 is stabilized. Thus, the regulating member 2 of the present embodiment can appropriately prevent buckling and meandering of the conductive body 1 and the wire harness WH.

The conductive body 1 of the present embodiment is the FFCs (flexible flat cables) 1a. The regulating member 2 supports the FFCs 1a that does not have high rigidity, so as to prevent buckling and meandering of the FFCs 1a.

Modification of Embodiment

The shape and the number of the regulating members 2 are not limited to the shape and the number exemplified in the embodiment. For example, the plate-like members 2a may each have a rectangular cross-sectional shape. The number of the plate-like members 2a included in the regulating member 2 can be any desired number, or may be one. The regulating member 2 may be formed of a rod-like member and a columnar member.

The number of the FFCs 1a included in the conductive body 1 can be any desired number, or may be one. The conductive body 1 may include round electric wires, flat type electric wires, and other electric wires in place of the exemplified FFCs 1a.

Contents that have been disclosed in the embodiment and the modification described above can be combined and executed as appropriate.

A routing structure according to the present embodiment includes a flexible conductive body, a flexible regulating member, a flexible exterior member, and a case. The conductive body has one end fixed to a vehicle body and has the other end fixed to a seat sliding along a rail arranged on the vehicle body. The regulating member extends along the conductive body and regulates a route of the conductive body. The exterior member has the conductive body and the regulating member each inserted therein, and is inserted into the rail. The case arranged adjacent to the rail houses parts of the conductive body, the regulating member, and the exterior member, the parts being on the side of the vehicle body, and absorbs extra lengths of the conductive body, the regulating member, and the exterior member depending on the sliding of the seat. With the routing structure according to the present embodiment, the regulating member for regulating a route of the conductive body can prevent buckling and meandering of the conductive body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A routing structure comprising:
   a flexible conductive body that has one end fixed to a vehicle body and has the other end fixed to a seat sliding along a rail arranged on the vehicle body;
   a flexible regulating member that extends along the flexible conductive body and regulates a route of the flexible conductive body;
   a flexible exterior member into which the flexible conductive body and the flexible regulating member are inserted, the flexible exterior member being inserted into the rail; and
   a case that is arranged adjacent to the rail, houses parts of the flexible conductive body, the flexible regulating member, and the flexible exterior member on a side of the vehicle body, and absorbs extra lengths of the flexible conductive body, the flexible regulating member, and the flexible exterior member depending on the sliding of the seat,
   the flexible regulating member includes a plate-like member that has a curved cross-sectional shape orthogonal to a longitudinal direction,
   the flexible regulating member has a plurality of the plate-like members laminated therein, and
   the plate-like members are laminated so that a projecting curve surface of the one plate-like member and a recessed curve surface of the other plate-like member face each other.

2. The routing structure according to claim 1, wherein an end part of the flexible regulating member on the side of the vehicle body is held inside the case.

3. The routing structure according to claim 2, wherein the flexible conductive body is a flexible flat cable.

4. The routing structure according to claim 1, wherein the flexible conductive body is a flexible flat cable.

* * * * *